3,501,489
1-PHENYLSULFONYL-2-(2-THIAZOLIN-2-YL-OXY AND THIOL) PYRROLIDINES

Peter H. L. Wei, Upper Darby, and Stanley C. Bell, Philadelphia, Pa., assignors to American Home Products Corporation, New York, N.Y., a corporation of Delaware
No Drawing. Original application Jan. 21, 1966, Ser. No. 536,479, now Patent No. 3,453,289, dated July 1, 1969. Divided and this application Feb. 3, 1969, Ser. No. 816,439
Int. Cl. C07d 91/24, 91/28
U.S. Cl. 260—306.7      2 Claims

ABSTRACT OF THE DISCLOSURE

This invention relates generally to 2-substituted 1-arylsulfonyl pyrrolidine compounds and to starting materials for preparing the former, and, more particularly, to novel p-substituted-phenylsulfonyl pyrrolidine derivatives having pharmacological activity, and to valuable intermediates for preparing said novel derivatives.

---

This is a division of an application Ser. No. 536,479, now U.S. Patent No. 3,453,289, July 1, 1969 filed Jan. 21, 1966.

The novel pharmacologically active p-substituted-phenylsulfonyl pyrrolidine derivatives encompassed by the present invention are those having the following general formula:

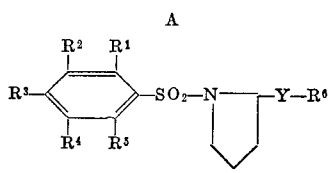

wherein $R^1$ and $R^5$ are each selected from the group consisting of hydrogen, alkyl, halogen, nitro and acylamine; $R^2$ and $R^4$ are each selected from the group consisting of hydrogen, alkyl, halogen, nitro, amino and acylamino; $R^3$ is selected from the group consisting of alkyl, halogen, nitro, amino and acylamino; Y is selected from the group consisting of oxygen and sulfur; and $R^6$ is selected from the group consisting of alkyl, provided that $R^3$ is other than methyl; dialkylaminoalkyl; alkoxyalkyl; alkylthicalkyl; phenyl; halophenyl; benzyl; haloalkylphenyl; thienyl; furyl; thiazolinyl; cycloalkyl; and a second p-substituted-phenylsulfonyl pyrrolidine group of the similar general formula:

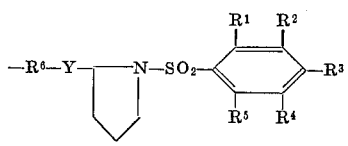

wherein, however, $R^6$ is specifically alkyl, but $R^1$, $R^2$, $R^3$, $R^4$, $R^5$ and Y are each as defined above.

The p-substituted-phenylsulfonamide derivatives of the invention which are particularly useful as intermediates in the preparation of the compounds of Formula A above are those having the following general formula:

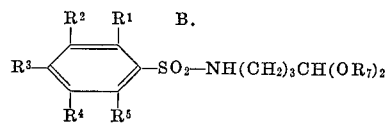

wherein $R^1$, $R^2$, $R^3$, $R^4$ and $R^5$ are as defined for the compounds of Formula A above; and $R^7$ is alkyl.

The general syntheses of the compounds of Formulae A and B above are represented schematically below wherein $R^1$, $R^2$, $R^3$, $R^4$, $R^5$, $R^6$ and $R^7$ have the same meanings as in said formulae:

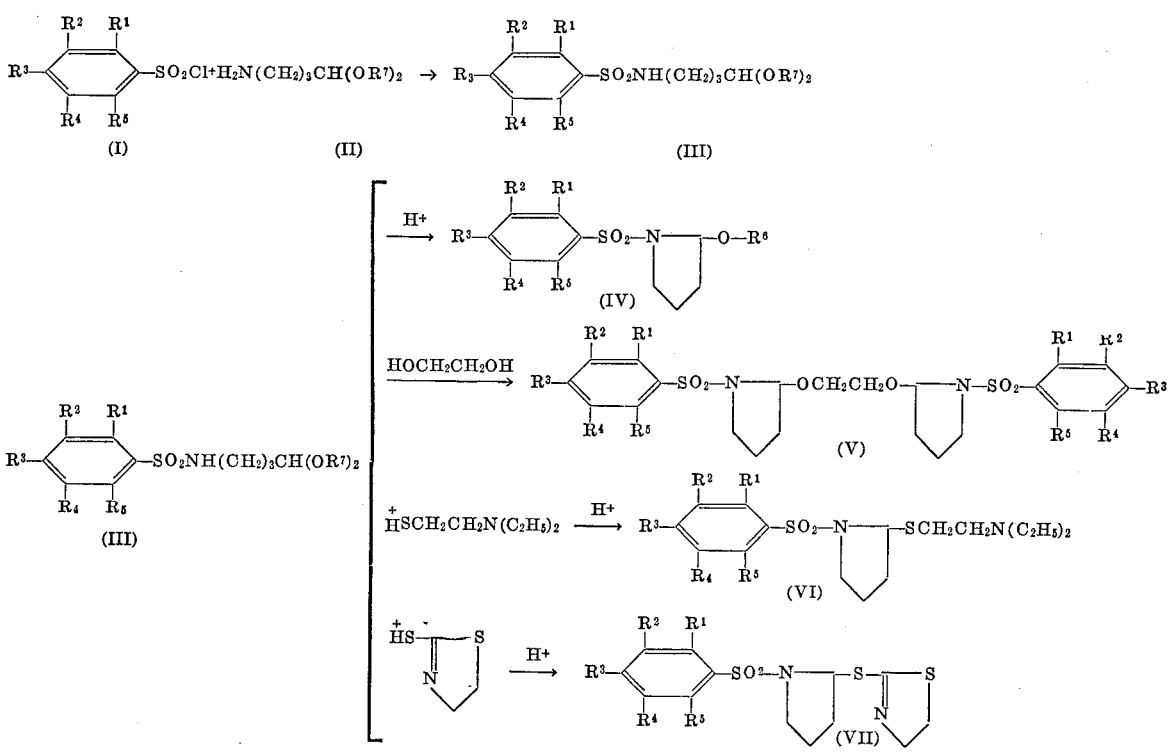

In preparing the compounds of the invention, a phenylsulfonyl chloride (I) in an inert solvent such as dimethoxyethane is added to a cold solution of an aminoacetal (II). The reaction solution is stirred, benzene is added and the mixture is then extracted with water. The organic layer is dried and the solvent is removed under reduced pressure to give the benzenesulfonamide denoted by Formula III. Treatment of this compound in alcohol with mineral acid causes ring closure to form the pyrrolidine (IV).

The bis compounds denoted by Formula V are prepared by dissolving the sulfonamide compounds of Formula III in ethylene glycol (or ethylene dithiol when the thio analogs are desired) containing a trace of a mineral acid such as hydrochloric acid and heating to around 50° to 80° C. The resulting product precipitates upon standing overnight and can be recrystallized from benzene.

Treatment of compounds of Formula III with a mercapto-tertiary amine in the presence of a mineral acid yields the 2-dialkylaminoalkylthio compounds of Formula VI. Similarly, treatment of said compounds of Formula III with a thiophenol yields the corresponding 2-phenylthiopyrrolidine compounds. In like manner, treatment of compounds of Formula III in acid medium with a mercapto-thiazine gives the corresponding 2-thiazinylthiopyrrolidine compounds (VII).

It has been discovered that compounds of Formula A. meeting the described qualifications, have useful pharmacological properites. More specifically, said compounds have been found to exhibit utility as central nervous system, diuretic and antiviral agents.

When the compounds of Formula A are employed for their central nervous system, diuretic and antiviral activity in mammals, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing conventional excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 7 mg. per kg. of body weight per day, although as aforementioned variations will occur. However, a dosage level that is in the range of from about 0.2 mg. to about 2 mg. per kg. of body weight per day is most desirably employed in order to achieve effective results.

The following examples are given by way of illustration.

EXAMPLE I p-Nitro-N(4,4-diethoxybutyl)-benzenesulfonamide p-Nitrobenzenesulfonyl chloride (22.10 g. or 0.10 m.) was slowly added to a cold dimethoxyethane solution of γ-aminobutyraldehyde diethyl acetal (19.30 g. 0.12 m.) containing 20 g. of triethylamine. After the solution was stirred for 20 minutes, benzene was added, followed by extraction of water. After the organic layer was dried over anhydrous magnesium sulfate, the solvent was removed at reduced pressure. The residue was recrystallized from a mixture of benzene and cyclohexane, M.P. 58–60° C.

Elemental analysis confirmed the empirical formula for $C_{14}H_{22}N_2O_6S$.

EXAMPLE II 2-ethoxy-1-(p-nitrophenylsulfonyl)pyrrolidine p-Nitro-(4,4-diethoxybutyl)-benzenesulfonamide (10.0 g.), prepared in accordance with Example I, was dissolved in ethyl alcohol. The solution was heated on a steam bath, in the presence of a few drops of conc. hydrochloric acid, for 10 min. The solution was cooled and the solid was collected. The compound can be recrystallized from n-hexane, M.P. 70–2° C.

Elemental analysis confirmed the empirical formula for $C_{12}H_{16}N_2O_5S$.

EXAMPLE III p-Bromo-N-(4,4-diethoxybutyl)-benzenesulfonamide p-Bromobenzenesulfonyl chloride (10.20 g. or 0.04 m.) was slowly added to a cold dimethoxyethane solution of γ-aminobutyraldehyde diethyl acetal (8.0 g. or 0.05 m.), containing 10 g. of triethyl amine. After the solution was stirred for 20 min., benzene was added, followed by extraction of water. After the organic layer was dried over anhydrous magnesium sulfate, the solvent was removed at reduced pressure. The residual solid was recrystallized from cyclohexane to give 13 g. of material, M.P. 87–8° C.

Elemental analysis confirmed the empirical formula for $C_{14}H_{22}BrNO_4S$.

EXAMPLE IV 1-(p-Bromophenylsulfonyl)-2-ethoxypyrrolidine p-Bromo-N-(4,4 - diethoxybutyl) - benzenesulfonamide (10 g.) of Example III was dissolved in 30 ml. of ethyl alcohol and the solution heated on a steam bath for 30 min. in the presence of 8 drops of conc. hydrochloric acid. After the solvent was removed at reduced pressure, the residue was recrystallized from cyclohexane, M.P. 51–3° C.

Elemental analysis confirmed the empirical formula for $C_{12}H_{16}BrNO_3S$.

EXAMPLE V 2,2′-ethylenedioxybis[1-(p-bromophenylsulfonylpyrrolidine]

p - Bromo - N - (4,4 - diethoxybutyl) - benzenesulfonamide of Example III (12.0 g. or 0.0313 m.) was dissolved in 50 ml. of ethylene glycol and heated on a steam bath, in the presence of 5 drops of hydrochloric acid, for 1 hour. The solution was let stand at room temperature overnight. The solid was collected and washed with ethyl alcohol. 8.0 g. was obtained. The compound was recrystallized from benzene, M.P. 188–190° C.

Elemental analysis confirmed the empirical formula for $C_{22}H_{26}Br_2N_2O_6S_2$.

EXAMPLE VI 1-p-aminophenylsulfonyl-2-ethoxypyrrolidine

The amino compound is prepared from the corresponding 1-p-nitro compound by catalytic hydrogenation using a platinum oxide catalyst.

EXAMPLE VII 1-(p-bromophenylsulfonyl)-2-[2-(diethylamino)-ethylthio]pyrrolidine hydrochloride p - Bromo - N - (4,4 - diethoxybutyl) - benenesulfonamide of Example III (3.80 g. or 0.01 m.) and N,N-diethylamino-ethanethiol hydrochloride (2.50 g. or 0.015 m.) were dissolved in 50 ml. of isopropyl alcohol and the solution heated on a steam bath, in the presence of 1 drop of conc. hydrochloride, for 3 hours. The solution was concentrated at reduced pressure and the residue recrystallized from isopropyl alcohol, M.P. 127–8° C.

Elemental analysis confirmed the empirical formula for $C_{16}H_{25}BrN_2O_2S_2 \cdot HCl$.

EXAMPLE VIII 1-(p-bromophenylsulfonyl)-2-(2-thiazolin-2-yl-thio)pyrrolidine p - Bromo - N - (4,4 - diethoxybutyl) - benzenesulfonamide of Example III (10.0 g. or 0.263 m.) and 2-mercaptothiazoline (5.0 g. or 0.0425 m.) were dissolved in dioxane and the solution heated on a steam bath for 30 minutes in the presence of a few drops of concentrated HCl. A small amount of insoluble material was filtered off and the filtrate concentrated. The residue was recrystallized from dioxane to give 5.10 g., M.P. 183–5° C.

Elemental analysis confirmed the empirical formula for $C_{13}H_{15}BrN_2O_2S_3$.

EXAMPLE IX p-Acetamido-N-(4,4-diethoxybutyl)benzenesulfonamide p-Acetamidobenzenesulfonyl chloride (27.5 g. or 0.118 m.) was gradually added to a cold dimethoxyethane solution of γ-aminobutyraldehyde diethyl acetal, containing 12.7 g. of triethylamine. The solution was stirred for 2 hours. Benzene was added and the solution extracted with water. After the organic layer was dried over anhydrous magnesium sulfate, the solvent was removed at a reduced pressure. The residue was recrystallized from isopropanol to give 26.0 g., M.P. 102–4° C.

Elemental analysis confirmed the empirical formula for $C_{16}H_{26}N_2O_5S$.

EXAMPLE X

4'-(2-ethoxy-1-pyrrolidinylsulfonyl)-acetanilide p-Acetamido - N - (4,4-diethoxybutyl)-benzenesulfonamide (8.00 g. or 0.0223 m.), prepared as in Example IX, was dissolved in $C_2H_5OH$ and the solution was let stand at room temperature in the presence of 5 drops of conc. hydrochloric acid. The solid was collected and rinsed with ethyl alcohol. This gave 4.50 g. of a solid melting at 113–5° C.

Elemental analysis confirmed the empirical formula for $C_{14}H_{20}N_2O_4S$.

EXAMPLE XI 1-(p-chloro-o-toluenesulfonyl)-2-ethoxypyrrolidine

A dimethoxyethane solution of p-chloro-o-toluenesulfonyl chloride is slowly added to a cold solution of γ-aminobutyraldehyde dimethyl acetal and triethylamine in the same solvent. The mixture is stirred for 15 minutes and benzene is then added. The resulting benzene solution is first washed with water and then dried over anhydrous magnesium sulfate. After the drying agent is removed, benzene is removed at reduced pressure. The residue is then dissolved in ethanol. After a few drops of hydrochloric acid are added to the ethanol solution, the latter is left to stand at room temperature overnight. Ethanol is thereafter removed at reduced pressure, and the resulting residue is recrystallized from ethanol to give 1-(p-chloro-o-toluenesulfonyl)-2-ethoxypyrrolidine.

EXAMPLE XII 1-p-ethylphenylsulfonyl-2-ethylthioethylthiopyrrolidine

The above compound is prepared by reacting N-(4,4-diethoxybutyl) - p - ethylbenzenesulfonamide with 2-ethylthioethyl mercaptan according to the procedure of Example IV.

EXAMPLE XIII 1-p-bromophenylsulfonyl-2-phenylthiopyrrolidine

The above compound is prepared by reacting p-bromo-N - (4,4 - diethoxybutyl) - benzenesulmonamide with thiophenol according to the procedure of Example IV.

EXAMPLE XIV 1-p-tolysulfonyl-2-cyclohexyloxy-pyrrolidine

The title compound is prepared by reacting N-(4,4-diethoxybutyl)-p-tolylsulfonamide with cyclohexanol according to the procedure of Example IV.

EXAMPLE XV 2,2'-ethylenedithiobis-(2,4-dimethylbenzenesulfonylpyrrolidine)

The above compound is prepared by reacting N-(4,4-diethoxybutyl) - 2,4 - dimethylbenzenesulfonamide with ethylenedithiol according to the procedure of Example V.

EXAMPLE XVI m-Chloro-N-(4,4-diethoxybutyl)-p-toluenesulfonamide

By following the procedure of Example I and using m-chloro-p-toluenesulfonyl chloride instead of p-nitrobenzenesulfonyl chloride as starting material, the above compound is prepared.

EXAMPLE XVII 1-(m-chloro-p-toluenesulfonyl)-2-ethoxypyrrolidine

By following the procedure of Example II, but substituting m - chloro - N - (4,4-diethoxybutyl)-p-toluenesulfonamide as starting material, the above compound is prepared.

EXAMPLE XVIII m-Amino-p-chloro-N-(4,4-diethoxybutyl)benzenesulfonamide

Again following the procedure of Example I, but in this instance using m-amino-p-chlorobenzesulfonyl chloride as starting material, the above compound is prepared.

EXAMPLE XIX 1-(m-amino-p-chlorophenylsulfonyl)-2-ethoxypyrrolidine

Utilizing the procedure of Example II, and substituting m-amino-p-chloro - N - (4,4-diethoxybutyl)benzenesulfonamide as starting material, the above compound is prepared.

EXAMPLE XX m-Amino-p-chloro-N-(4,4-diethoxybutyl)-o-toluenesulfonamide

Using m-amino-p-chloro-o-toluenesulfonyl chloride as starting material in the procedure of Example I, the above compound is obtained.

EXAMPLE XXI 1-(m-amino-p-chloro-o-toluenesulfonyl)-2-ethoxypyrrolidine

By following the procedure of Example II and substituting m - amino - p - chloro-N-(4,4-diethoxybutyl)-o-toluenesulfonamide as starting material, the above compound is obtained.

We claim:
1. A compound of the formula:

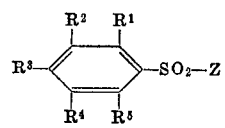

wherein $R^1$ and $R^5$ are each selected from the group consisting of hydrogen, lower alkyl, halogen, nitro and lower alkanoylamino; $R^2$ and $R^4$ are each selected from the group consisting of hydrogen, lower alkyl, halogen, nitro, amino and lower alkanoylamino; $R^3$ is selected from the group consisting of alkyl, halogen, nitro, amino and lower alkanoylamino; and Z is

wherein $R^6$ is thiazolinyl; and Y is selected from the group consisting of oxygen and sulfur.

2. A compound as defined in claim 1 which is: 1-(p-bromophenylsulfonyl) - 2 - (2 - thiazolin - 2 - yl - thio) pyrrolidine.

References Cited

UNITED STATES PATENTS 3,453,289  7/1969  Wei et al. _____ 260—326.82

HENRY R. JILES, Primary Examiner
C. M. SHURKO, Assistant Examiner

U.S. Cl. X.R.

260—238.95